Figure 1:
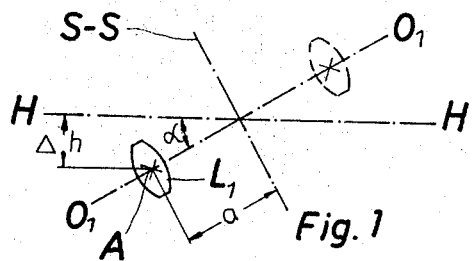

United States Patent
Huther et al.

[15] 3,704,954
[45] Dec. 5, 1972

[54] LEVELING INSTRUMENT

[72] Inventors: Gerhard Huther; Rolf Roder; Ulrich Schmidt, all of Jena, Germany

[73] Assignee: Jenoptik Jena G.m.b.H., Jena, Gera, Germany

[22] Filed: Dec. 7, 1970

[21] Appl. No.: 93,279

[52] U.S. Cl. .................356/143, 350/16, 356/146, 356/149, 356/248, 356/250
[51] Int. Cl. .........G01c 1/06, G01c 9/02, G01c 9/12
[58] Field of Search......346/143, 146, 149, 250, 248; 350/16

[56] References Cited

UNITED STATES PATENTS

| | | | |
|---|---|---|---|
| 3,059,520 | 10/1962 | Tsubokawa | 356/250 |
| 3,220,297 | 11/1965 | Baker et al. | 356/250 |
| 3,552,866 | 1/1971 | Huther | 356/250 |

*Primary Examiner*—Ronald L. Wibert
*Assistant Examiner*—Warren A. Sklar

[57] ABSTRACT

A leveling instrument comprises a sighting telescope and an optical micrometer. The anallactic point, or telescope point of tilt, decisive for the height measurement is exterior to the vertical axis of rotation of the telescope. By means of the micrometer, the collimating mark and the leveling staff are so displaced relatively to one another in the telescope field of vision that the mark and a full interval of the leveling staff coincide. The relative displacement is indicated by an index on a scale and read through an optical reading system. The reading system includes an optical compensator for balancing the effect which the distance between the anallactic point and the vertical axis of rotation of the telescope produces on the height measurement.

3 Claims, 6 Drawing Figures

PATENTED DEC 5 1972

3,704,954

INVENTORS

LEVELING INSTRUMENT

This invention relates to leveling instruments comprising a telescope, an optical micrometer and an optical system for imaging the micrometer readings, in which the anallactic point of tilt decisive for the height measurement is exterior to the vertical axis of rotation of the telescope.

It is well known that the theoretically possible accuracy of measurement in leveling instruments can only be obtained if the anallactic point of height measurement and the measuring mark lie in the object side principal plane of the telescope objective, which must also contain the vertical axis of rotation of the telescope. However, leveling instruments fulfilling this condition suffer from a certain lopsidedness with respect to the axis of rotation, and the make-up and arrangement also of their optical parts is far from satisfactory, so that such instruments are hardly ever use in spite of all their merits.

Studies on the anallactic point in height measurements were published in "Zeitschrift fur Vermessungswesen," 1951, pp. 229 and 230, and in "Jenaer Jahrbuch," 1958, part 1, pp. 171 to 175.

The present invention aims at obviating the foregoing disadvantages by providing a leveling instrument of compact construction and greatest possible accuracy regardless of non-coincidence of vertical axis of rotation and anallactic point of tilt.

To this end the present invention consists in a leveling instrument of the foregoing kind, wherein a compensation device in the optical system of the micrometer reacts upon tilts of the leveling instrument by redressing such altitude errors in the result of the measurement as are due to non-coincidence of the anallactic point of tilt and the axis of rotation of the telescope. For microscopic measurement, either the objective is displaced vertically at right angles to its optical axis, or a plano-parallel plate is used which is rotatable at least about an axis at right angles to the optical axis, this displacement or rotation being measured preferably in units of length by means of an index and scale and an appropriate reading system.

The compensation device in the micrometer may be of any suitable kind. There may be pendulum suspension for either the micrometer graduation, or the micrometer index, or the micrometer objective, or parts of this objective, or part of the reflecting system in the micrometer, or the entire reflecting system.

If the leveling instrument is equipped with an automatic sighting line control, it is advantageous to connect the compensation device to this control, the micrometer reading preferably appearing in the telescope eyepiece. By suitably constructing the micrometer, it is possible to provide that the quality of the leveling can be checked while the measuring process takes place.

Figure 2:
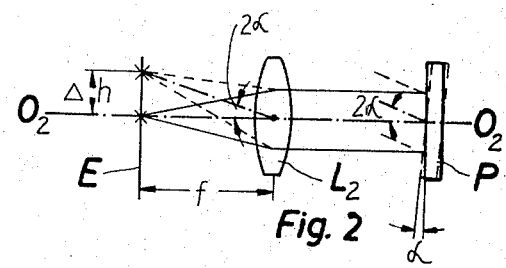
Figure 3:
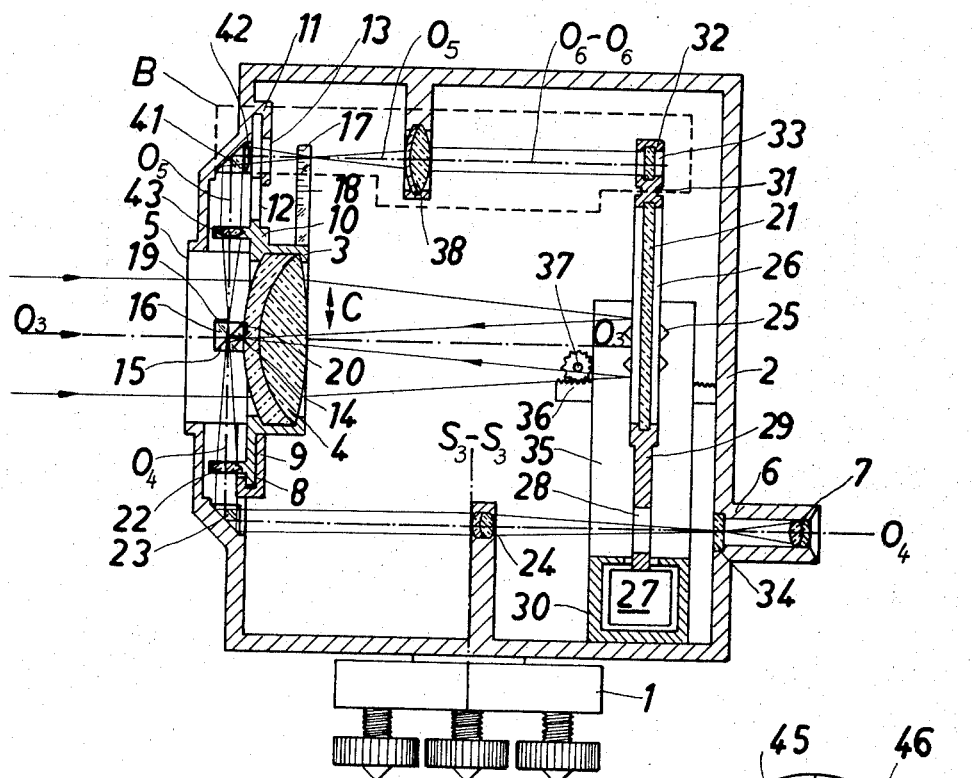
Figure 5:
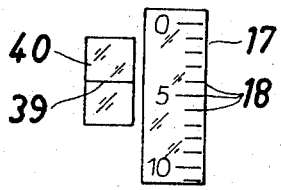
Figure 6:
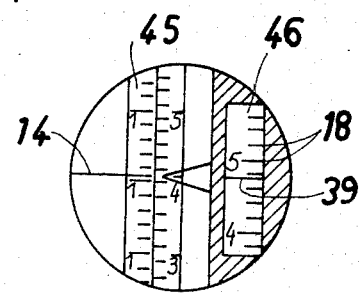
Figure 4:
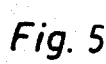

In order that the invention may be more readily understood, reference is made to the accompanying drawings which illustrate diagrammatically and by way of example a leveling instrument according to the invention, and in which FIGS. 1 and 2 are diagrammatical representations for explaining the principle of the invention, FIG. 3 is a longitudinal section through a leveling instrument, FIG. 4 is a top view of the optical parts of FIG. 3 which are surrounded by broken lines, FIG. 5 shows the plate of the reading mark and that of the micrometer graduation, and FIG. 6 shows the eyepiece field-of-view of the leveling instrument.

In FIG. 1 of the drawings, the optical axis $O_1-o_1$ of an objective $L_1$ of a leveling instrument (not shown) is inclined to the horizontal plane H—H because of the unavoidable obliqueness of the vertical axis S—S of the instrument, which is shown exaggerated for the sake of clearness. The plane H—H is at right angles to the plane of the drawing. The anallactic point of tilt A is located at a distance $a$ from the axis S—S and at a distance $\Delta h$ from the plane H—H and lies in the horizontal collimation line. The axis $O_1-o_1$ and the plane H-H enclose an angle $\alpha$. Rotation of the objective $L_1$ about the axis S—S displaces the anallactic point A along a circular path which is inclined at $\alpha$ to the plane H—H. If $\alpha$ is small, the distance of A from H—H, depending on the amount of rotation, is $$\Delta h = a \cdot \Delta \text{TM} \quad (\text{I})$$

Every measurement requires the distance $\Delta h$ to be automatically reduced to zero in dependency on the rotation of the instrument about the axis S—S, the distance $a$, and the inclination $\alpha$. This elimination of $\Delta h$ can be effected by means of a compensation device.

If the compensation device is a simple plane-parallel pendulum reflector P, as shown in FIG. 2, which lies in the path of parallel rays from a lens $L_2$ having an optical axis $O_2-o_2$, a focal length $f$ and a focal plane E, the reflector P compensates an off-axis position $$\Delta h = f \cdot 2\Delta \quad (\text{II})$$

where $\alpha$ is the inclination of the reflector P (inclination of the instrument). Equation of (I) and (II) shows that the off-axis position $\Delta h$ is compensated in any case if $$f = a/2 \quad (\text{III})$$

This relation will as a rule be different if a compensator of another form and other compensation properties is used.

In FIG. 3, a housing 2 is mounted on a tripod 1 for rotation about an axis $S_3-s_3$. One side of the housing 2 has an aperture 5, adjacent to which the amount 3 of an objective 4 is attached to the interior of the housing 2. The opposite side of the housing 2 carries a tube 6 which includes an eyepiece 7. The objective 4 is displaceable in guides 8, 9 and 10, 11 in the directions of an arrow C and can be locked in any desired position. The guides 10 and 11 respectively have apertures 12 and 13. The objective 4 carries a collimating mark 14 and a glass cube 16 having an interface 15. The mark 14 lies in the optical axis $O_3-o_3$ of the objective 4, the mount 3 of which carries the transparent plate 17 of a micrometer graduation 18 (FIG. 5). Two contiguous faces of the cube 16 are respectively provided with opaque coatings 19 and 20 of equal areas which complement one another and are thus equal to or greater than the cross-sectional area of the bundle of imaging rays traversing the cube 16.

The objective 4 and the eyepiece 7 are the essential optical elements of a telescope system the anallactic point of which coincides with the collimating mark 14. The telescope system also comprises a pendulum reflector 21, which is located at approximately half the focal length of the objective 4, the collimating mark 14, the interface 15, a lens 22 in the mount 3, a rectangular prism 23, and an imaging optical member 24. The object side focal plane of the eyepiece 7 contains a glass plate 34. An optical axis $O_4$—$o_4$ common to the lens 22, the optical member 24 and the eyepiece 7, is bent so as to contain the point of intersection of the axis $O_3$—$o_3$ and the interface 15. The pendulum reflector 21 is fast with a mount 26, the suspension 25 of which lies in the rear of the plane of the drawing. A piston 27 slides in a cylinder 30 and is connected to the mount 26 by a rod 29 which has an aperture 28 for the telescope ray path. The piston 27 and the cylinder 30 make up into a device for pneumatically damping the oscillations of the pendulum reflector 21. A small reflector 33 in a mount 32 is rigidly connected to the reflector 21 by a rod 31 and takes part in the oscillations of this reflector. Both the pendulum suspension 25 and the damping device 27, 30 are mounted in a frame 35. A rack 36 rigidly connected to the frame 35 engages a pinion 37 which is mounted in the housing 2.

The collimating mark 14 and the cube 16 that carries the coatings 19 and 20, lie in the object side focal plane of the lens 22. The light rays between the lens 22 and the optical member 24 are parallel to each other. The optical member 24 produces an image in the image plane of the eyepiece 7. If images are formed in the rear or in front of this plane, they can be brought into focus by rotating the pinion 37 from outside, so that the rack 36 causes the frame 35 and, accordingly, the pendulum reflector 21 to be displaced.

The reflector 33 is located in the parallel ray path of an imaging system 38 the focal plane of which includes, in juxtaposition to one another, the micrometer graduation 18 on the plate 17 and an index 39 on a transparent plate 40 (FIG. 5). The graduation 18 also lies in the object side focal plane of a lens 42 cemented to a right-angled prism 41. A lens 43 is so disposed in the mount 3 that it has a common optical axis $O_5$—$o_5$ with the lens 42 and that the face of the cube 16 which carries the coating 19 is permanently at a distance from the lens 43 that corresponds to the focal length of this lens. The graduation 18 has always a point in common with the axis $O_5$—$o_5$, which is parallel to the optical axis $O_6$—$o_6$ of the imaging system 38 (FIG. 4). The graduation 18 and the index 39 are symmetrically disposed with respect to the axis $O_6$—$o_6$, and the axes $O_5$—$o_5$ and $O_6$—$o_6$ as well as the index 39 are coplanar with each other when the axis $S_3$—$s_3$ is exactly vertical.

An off-axis beam of light, represented in FIG. 4 by its principal ray 44, proceeds from the index 39 through the imaging system 38 to the small pendulum reflector 33 and from thence through the imaging system 38 to the graduation 18, on which an image of the index 39 appears. The reflector 33 provides that an inclination $\alpha$ of the housing 2 in the plane of the drawing causes the two legs of the principal ray 44 to enclose an angle $2\alpha$. The lenses 42 and 43 by way of the apertures 12, 13 image the graduation 18 on, and transfer the image of the index 39 to, the face of the cube 16 that carries the coating 19. Moreover, the objective 4 by way of the pendulum reflector 21 images a remote target (not shown) on the face of the cube 16 that carries the coating 20. The coatings 19 and 20 cut down the obtained respective images in such a manner that the masked portion of the one image is replaced by the unmasked portion of the other.

The optical system 22, 24 transfers both these images to the focal plane of the eyepiece 7, in which the graduation 18 and the index 39 appear as shown in FIG. 6, wherein 45 is the image of part of a distant leveling staff, which moves relatively to the mark 14 when the objective 4 is being displaced. The index 39 and part of the graduation 18 are visible in a window 46 of the portion of the field of vision which is blackened by the coating 20.

The relationship defined by equation (III) is thus maintained in spite of the fact that the anallactic point 14 of the telescope is exterior to the axis $S_3$—$s_3$. In other words, the reflector 33, which is permanently plumb-lines, compensates any error caused by an off-position of the anallactic point.

The embodiment of the compensation device and the micrometer particularly described is represented merely as an example of how the invention may be applied, other embodiments, forms and modifications of the present invention coming within the proper scope of the appended claims will of course readily suggest themselves to those skilled in the art. For example, the micrometer graduation and the index may be arranged behind one another in a straight ray path, one or more pendulum prisms being located therebetween. In this case, the micrometer reading system would preferably have to be entirely separate from the telescope optical system. It would also be feasible to provide the index and the micrometer graduation themselves as pendulums, or to engrave the micrometer graduation on a drum that moves relatively to a coplanar index. In the latter case, a compensation device would have to be employed that influences only half the imaging ray path.

We claim:

1. A leveling instrument rotatable about a substantially vertical axis in which the anallactic point decisive for height measurement is exterior to said axis, comprising a telescope housing,
an objective,
an eyepiece,
a collimating mark,
   said objective, said eyepiece and said mark being positioned in said housing,
   said objective and said eyepiece having a common optical axis and a common image plane which is substantially at right angles to said optical axis,
   said mark lying in both said optical axis and said image plane,
   said objective imaging a distant object in said image plane,
an optical means for relative displacement in said image plane of said mark and the image of said object,
optical elements for directing the imaging ray path from said objective to said eyepiece,
a micrometer for measurement of the relative displacement of said mark and the image of said object,
   said micrometer being attached to said housing and comprising an index, a scale and a reading system,
   said index and said scale being displaceable relatively to one another and being connected with said optical means for the indication of the relative displacement of said mark and the image of said object, said reading system being for reading this indication, an optical compensator comprising a pendulum attaching a first deviating optical element, said first deviating optical element being included in the ray path of said reading system and compensating height measuring errors as a function of the distance between the anallactic point and said vertical axis of rotation.

2. A leveling instrument as claimed in claim 1, wherein a sighting line control is included in the imaging ray path between said objective and said eyepiece, said sighting line control comprises a pendulum attaching a second deviating optical element, and said first deviating optical element and said second deviating optical element are rigidly interconnected with one another.

3. A leveling instrument as claimed in claim 2, wherein said eyepiece forms part of said reading system, and wherein the imaging ray path between said objective and said eyepiece and said reading system include a common ray-combining optical element.

* * * * *